United States Patent Office 3,100,799
Patented Aug. 13, 1963

3,100,799
PROCESS FOR PREPARING 1-HYDROXYALKYL-PHOSPHINE OXIDES
Michael M. Rauhut, Norwalk, and Andrew M. Semsel, Stamford, Conn., assignors to American Cyanamid Company, Stamford, Conn., a corporation of Maine
No Drawing. Filed July 20, 1962, Ser. No. 211,411
2 Claims. (Cl. 260—606.5)

This invention relates to organophosphorus compounds and to the preparation of same. More particularly, the present invention relates to alpha-hydroxy-substituted tertiary phosphine oxides.

Pursuant to the instant discovery elemental phosphorus is brought into reactive contact, in the presence of an inert organic solvent, such as an ether, with an organometallic compound of the formula $$RMX_n$$

wherein R is alkyl having from 1 to 12 carbon atoms, fluoro-substituted alkyl having from 1 to 12 carbon atoms, cycloalkyl, aryl, and substituted aryl. Typical substituents for aryl are trifluoromethyl, halogen, lower alkoxy, lower alkyl, and like inert substituents. M represents, lithium, magnesium and sodium. X is halogen and $n$ represents 0 or 1.

The product from the reaction of elemental phosphorus and an organometallic compound is then reacted, according to the present invention, with benzaldehyde, substituted benzaldehyde, or an alkyl aldehyde having from 1 to 12 carbon atoms. Typical substituents for benzaldehyde are halogen, lower alkoxy and similar inert substituents. This step of the reaction contemplated herein is likewise best carried out in the presence of an inert organic solvent, such as an ether.

The product from this second step is then hydrolyzed with water or, preferably, a dilute aqueous acid to produce the final product of the present invention, alpha-hydroxy-substituted tertiary phosphine oxide of the formula

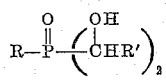

in which R' is phenyl, substituted phenyl or alkyl ($C_1$–$C_{11}$), i.e., the residue of the corresponding aldehyde, and R has the meaning given in the organometallic reaction formula, above.

The following equation best illustrates the process of the present invention:

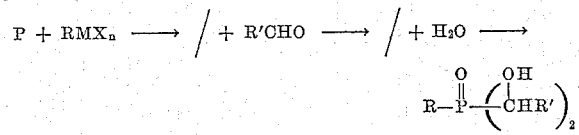

Typical substituted or unsubstituted, mono-and di-nuclear aryl lithium, magnesium and sodium compounds, substituted or unsubstituted, alkyl ($C_1$–$C_{12}$) lithium, magnesium and sodium compounds, and cycloalkyl lithium, magnesium and sodium compounds within the purview of the instant invention are: n-butyllithium, n-butylmagnesium bromide, n-butylmagnesium chloride, methylmagnesium iodide, pentylsodium, methylmagnesium chloride, 1-naphthyllithium, 3-(trifluoromethyl)phenyllithium, 4-fluorophenyllithium, 4 - methoxyphenyllithium, octylmagnesium bromide, heptyllithium, hexylmagnesium bromide, cyclohexyllithium, n - dodecyllithium, heptafluoropropyllithium, 6-methoxy-2-naphthyllithium, n-propyllithium, 4-tolyllithium, 4-chlorophenyllithium, and the like.

Obviously, from the above list of organometallic compounds, the metallic moiety may or may not be halogenated. Likewise, the organic moiety may or may not be substituted. Typical substituents for the organic moiety are those which under the conditions of the reaction contemplated herein are inert: halogen, such as fluorine and the like, lower alkoxy, such as methoxy, ethoxy, propoxy and butoxy, and like substituents.

The elemental phosphorus reactant may be employed, as indicated hereinabove, as a finely-divided white phosphorus. However, elemental phosphorus in a different physical state, such as molten phosphorus or phosphorus in the form of "chunks," or other similar fractions, may be employed.

As indicated above, the first two steps of the reaction contemplated herein are preferably carried out in the presence of an inert organic solvent, i.e. a solvent which under the conditions of the reaction does not react to any substantial degree with the reactants. Typical inert solvents are ethers, aromatic hydrocarbons, and the like, such as the following: tetrahydrofuran, diethylether, benzene, toluene, xylene, dimethoxyethane, diethylether of diethyleneglycol, dioxane. In addition, aliphatic and cycloaliphatic hydrocarbon solvents are within the purview of the instant discovery, such as, pentane, decane, cyclopentane, and the like.

Very good results are obtained, as will be seen hereinafter, by establishing a slurry of finely-divided white phosphorus in the inert organic solvent and a solution of oganometallic reactant in a similar inert organic solvent and adding the latter to the slurry. It has been found, however, that direct admixture of elemental phosphorus with a solution of the organometallic reactant may be employed with satisfactory results.

As to the ratio of reactants generally employed, usually at least 0.5:1 but generally not more than about 2:1, organometallic reactant to phosphorus atom, is employed.

At least a stoichiometric amount of the aldehyde reactant, relative to the organometallic reactant, is generally employed. Less than this stoichiometric amount or a substantial excess of the aldehyde may be used, however, without altering the nature of the reaction. The ratio is not critical but it should be practical.

Hydrolysis of the reaction mixture resulting from the first step of the process contemplated herein is carried out by conventional means using water or dilute mineral acid, such as dilute HCl, $H_2SO_4$, etc., and the resulting products are isolated by precipitation with a suitable solvent, such as an ether, or by distillation under reduced pressure or in an inert atmosphere.

In addition, other aqueous acids, such as acetic acid, formic acid, propionic acid, trifluoroacetic acid, and like, may be used in lieu of an aqueous mineral acid.

The three-step process of the present invention may be carried out at atmospheric, sub-atmospheric or super-atmospheric pressure. Batch, continuous or semi-continuous conditions may be employed.

The reactions of the present invention are best carried out at a temperature in the range of 0° C. to 150° C., preferably 20° C. to 75° C., as will be evident from the illustrative examples infra.

The alpha-hydroxy-substituted tertiary phosphine oxides of the present invention have direct utility as gasoline additives. For example, up to about 10 milliliters of any one of these tertiary phosphine oxides, when dissolved in one gallon of gasoline, affords protection against misfiring, surface ignition, and the like.

The present invention will best be understood from the following examples which are merely illustrative and not intended to unduly limit the scope of the present invention:

EXAMPLE I

*Bis(alpha-hydroxybenzyl)phenylphosphine Oxide*

White phosphorus (7.8 grams, 0.25 gram atom) is combined with a solution of 0.5 mole of phenyllithium in 750 milliliters of ether under nitrogen. The mixture is stirred at a reflux for 3 hours and allowed to cool to room temperature. A solution of 53.1 grams (0.5 mole) of benzaldehyde in 50 milliliters of ether is added dropwise with stirring during 30 minutes. The reaction is moderately exothermic, and the mixture refluxes gently. Near the end of the addition the color changes from dark red to yellow. The mixture is stirred one additional hour and then treated dropwise with 30.0 grams (0.5 mole) of glacial acetic acid. The mixture is treated with 100 milliliters of water, and the phases are separated.

The organic phase is diluted to 1 liter with ether and allowed to stand at 0° C. overnight. The solution deposits a crystalline solid, which is collected to obtain 10.2 grams (12%) of bis(α-hydroxybenzyl)phenylphosphine oxide, melting point 186° C.–187° C.

EXAMPLES II–XXVII

In the following table further examples are given, which examples are carried out essentially as in Example I, above, except as shown in the table. When the product, unlike that of Example I, is water soluble, recovery thereof from the aqueous phase is accomplished by evaporation of the aqueous phase to dryness and subsequent extraction with methanol. While methanol is used in these examples, it will be obvious to the skilled chemist that other suitable solvents may be employed, including other alkanols.

Table I

| Example No. | P | +RMX$_n$ | Temp. °C. | Molar Ratio RMX$_n$:P | Solvent | +R'CHO | Temp. °C | Molar Ratio R'CHO:RMX$_n$ | /+H$_2$O→ | $R-\underset{\underset{O}{\|}}{P}-\left(\underset{\underset{CHR'}{\|}}{OH}\right)_2$ |
|---|---|---|---|---|---|---|---|---|---|---|
| II | P | n-Butyllithium | 0 | 0.5:1 | (C$_2$H$_5$)$_2$O | Benzaldehyde | 0 | 1:1 | | Bis(α-hydroxybenzyl)n-butylphosphine oxide. |
| III | P | n-Butylmagnesium bromide. | 65 | 2:1 | THF ª | p-Chlorobenzaldehyde. | 65 | 1:1 | | Bis(α-hydroxy-4-chlorobenzyl)n-butylphosphine oxide. |
| IV | P | n-Butylmagnesium chloride. | 35 | 1.5:1 | (C$_2$H$_5$)$_2$O | p-Propylbenzaldehyde. | 35 | 1:1 | | Bis(α-hydroxy-4-propylbenzyl)n-butylphosphine oxide. |
| V | P | Methylmagnesium iodide. | 15 | 1:1 | (C$_2$H$_5$)$_2$O | Butanal | 15 | 2:1 | | Bis(α-hydroxybutyl)-methylphosphine oxide. |
| VI | P | Pentylsodium | 5 | 1:1 | Pentane | Acetaldehyde | 5 | 1:1 | | Bis(α-hydroxyethyl)-pentylphosphine oxide. |
| VII | P | Decylsodium | 10 | 1.5:1 | Decane | Dodecanal | 10 | 1:1 | | Bis(α-hydroxyldodecyl)-decylphosphine oxide. |
| VIII | P | 1-naphthyllithium. | 35 | 1:1 | (C$_2$H$_5$)$_2$O | Pentanal | 35 | 0.8:1 | | Bis(α-hydroxypentyl)-1-naphthylphospine oxide. |
| IX | P | 3-(trifluoromethyl)phenyllithium. | 35 | 1:1 | (C$_2$H$_5$)$_2$O | p-Ethoxybenzaldehyde. | 35 | 1:1 | | Bis(α-hydroxy-4-ethoxybenzyl)-3-(trifluoromethyl)phenylphosphine oxide. |
| X | P | 4-fluorophenyllithium. | 35 | 1:1 | (C$_2$H$_5$)$_2$O | Hexanal | 35 | 1:1 | | Bis(α-hydroxyhexyl)-4-fluorophenylphosphine oxide. |
| XI | P | 4-methoxyphenyllithium. | 35 | 1:1 | (C$_2$H$_5$)$_2$O | Benzaldehyde. | 35 | 1:1 | | Bis(α-hydroxybenzyl)-4-methoxyphenylphosphine oxide. |
| XII | P | Octylmagnesium bromide. | 35 | 1.5:1 | (C$_2$H$_5$)$_2$O | Meta-methoxybenzaldehyde. | 35 | 1:1 | | Bis(α-hydroxy-3-methoxybenzyl)octylphosphine oxide. |
| XIII | P | Heptyllithium | 35 | 1:1 | (C$_2$H$_5$)$_2$O | Formaldehyde. | 35 | 1:1 | | Bis(hydroxymethyl) heptylphenylphosphine oxide. |
| XIV | P | Phenylmagnesium bromide. | 102 | 1:1 | (C$_4$H$_9$)$_2$O | Benzaldehyde. | 102 | 1:1 | | Bis(α-hydroxybenzyl)-phenylphosphine oxide. |
| XV | P | Cyclohexyllithium. | 35 | 3:1 | (C$_2$H$_5$)$_2$O | p-Bromobenzaldehyde. | 35 | 1:1 | | Bis(α-hydroxy-4-bromobenzyl)cyclohexylphosphine oxide. |
| XVI | P | n-Dodecyllithium. | 21 | 1:1 | (C$_2$H$_5$)$_2$O | p-Iodobenzaldehyde. | 21 | 1:1 | | Bis(α-hydroxy-4-iodobenzyl)n-dodecylphosphine oxide. |
| XVII | P | Heptafluoropropyllithium. | 17 | 1:1 | (C$_2$H$_5$)$_2$O | Undecanal | 17 | 1:1 | | Bis(α-hydroxyundecyl)-heptafluoropropylphosphine oxide. |
| XVIII | P | 6-methoxy-2-naphthyllithium. | 34 | 1:1 | (C$_2$H$_5$)$_2$O | Benzaldehyde. | 34 | 1:1 | | Bis(α-hydroxybenzyl)-6-methoxy-2-naphthylphosphine oxide. |
| XIX | P | n-Propyllithium | 18 | 1:1 | (C$_2$H$_5$)$_2$O | p-Chlorobenzaldehyde. | 18 | 1:1 | | Bis(α-hydroxy-4-cholrobenzyl)n-propylphosphine oxide. |
| XX | P | 4-tolyllithium | 12 | 1:1 | (C$_2$H$_5$)$_2$O | o-Butoxybenzaldehyde. | 12 | 2:1 | | Bis(α-hydroxy-2-butoxybenzyl)4-tolylphosphine oxide. |
| XXI | P | 4-chlorophenyllithium. | 0 | 2:1 | (C$_2$H$_5$)$_2$O | Acetaldehyde | 0 | 1:1 | | Bis(α-hydroxyethyl)-4-chlorophenylphosphine oxide. |
| XXII | P | Phenylsodium | 20 | 1:1 | Benzene | Formaldehyde. | 20 | 1:1 | | Bis(hydroxymethyl) phenylphosphine oxide. |
| XXIII | P | 2-(trichloromethyl)phenylmagnesium chloride. | 15 | 0.5:1 | (C$_2$H$_5$)$_2$O | Benzaldehyde | 15 | 1:1 | | Bis(α-hydroxybenzyl)-2-(trichloromethyl)-phenylphosphine oxide. |
| XXIV | P | Cyclopentylsodium. | 0 | 1:1 | Cyclopentane. | p-Ethoxybenzaldehyde | 0 | 1:1 | | Bis(α-hydroxy-4-ethoxybenzyl)cyclopentylphosphine oxide. |
| XXV | P | 4-tolylmagnesium iodide. | 25 | 1:1 | (C$_2$H$_5$)$_2$O | Benzaldehyde. | 25 | 1:1 | | Bis(α-hydroxybenzyl)4-tolylphosphine oxide. |
| XXVI | P | Phenyllithium | 30 | 1:1 | (C$_2$H$_5$)$_2$O | Hexanal | 30 | 1:1 | | Bis(α-hydroxyhexyl)phenylphosphine oxide. |
| XXVII | P | 3-ethylphenylmagnesium bromide. | 65 | 1:1 | THF ª | Heptanal | 65 | 1:1 | | Bis(α-hydroxyheptyl)3-ethylphenylphosphine oxide. |

ª Tetrahydrofuran.

We claim:
1. A method which comprises bringing into reactive contact, in the presence of an inert organic solvent, elemental phosphorus and an organometallic compound of the formula

RMX$_n$ reacting the resulting reaction product with an aldehyde of the formula R'CHO, and hydrolyzing the reaction product of the second step, thus producing alpha-hydroxy-substituted tertiary phosphine oxide of the formula

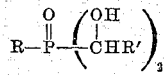

R in the above formulae representing a member selected from the group consisting of alkyl having from 1 to 12 carbon atoms, fluoro-substituted alkyl having from 1 to 12 carbon atoms, cycloalkyl, aryl, and substituted aryl, said substituents for aryl being selected from the group consisting of trifluoromethyl, fluoro, chloro, lower alkyl, and lower alkoxy; R' is a member selected from the group consisting of phenyl, substituted phenyl, and alkyl having from 1 to 11 carbon atoms, said substituents for phenyl being selected from the group consisting of halogen and lower alkoxy; M represents a member selected from the group consisting of lithium, magnesium and sodium; X is halogen; and $n$ is selected from 0 and 1.

2. The process of claim 1 wherein the organo-metallic reactant is phenyllithium, ether is the solvent, the aldehyde is benzaldehyde and the product is bis(alphahydroxybenzyl)phenylphosphine oxide.

No references cited.